United States Patent
Oh et al.

(10) Patent No.: US 8,045,578 B2
(45) Date of Patent: Oct. 25, 2011

(54) METHOD FOR CONTROLLING EVENT AND REPORTING STATUS OF CABLE MODEM AND APPARATUS THEREOF

(75) Inventors: Hye-Ju Oh, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 154 days.

(21) Appl. No.: 12/548,748

(22) Filed: Aug. 27, 2009

(65) Prior Publication Data

US 2010/0157828 A1    Jun. 24, 2010

(30) Foreign Application Priority Data

Dec. 19, 2008  (KR) .................. 10-2008-0130429

(51) Int. Cl.
*H04J 3/16* (2006.01)
*H04L 12/403* (2006.01)
*H04L 12/43* (2006.01)

(52) U.S. Cl. ......... 370/465; 370/447; 370/449; 370/461

(58) Field of Classification Search .................. 370/499, 370/447, 465, 461
See application file for complete search history.

(56) References Cited

U.S. PATENT DOCUMENTS

| | | | | |
|---|---|---|---|---|
| 6,052,377 | A * | 4/2000 | Ohmi et al. .................. | 370/437 |
| 6,114,968 | A * | 9/2000 | Ramakrishnan et al. .... | 340/3.51 |
| 2007/0047449 | A1 | 3/2007 | Berger et al. | |
| 2008/0018427 | A1* | 1/2008 | Ezra et al. .................... | 340/7.32 |
| 2008/0025327 | A1* | 1/2008 | Kumar .......................... | 370/401 |
| 2008/0130681 | A1* | 6/2008 | Hong et al. .................. | 370/468 |
| 2009/0141784 | A1* | 6/2009 | Cho et al. .................... | 375/222 |
| 2009/0240377 | A1* | 9/2009 | Batzler et al. ................ | 700/287 |
| 2009/0310480 | A1* | 12/2009 | Bao et al. ..................... | 370/217 |
| 2010/0235512 | A1* | 9/2010 | Beser ........................... | 709/226 |
| 2010/0238950 | A1* | 9/2010 | Beser ........................... | 370/449 |
| 2011/0032821 | A1* | 2/2011 | Morrill et al. ................ | 370/230 |

FOREIGN PATENT DOCUMENTS

KR    1020030079441 A    10/2003

* cited by examiner

*Primary Examiner* — Andrew Lee
(74) *Attorney, Agent, or Firm* — Ladas & Parry LLP

(57) ABSTRACT

Provided is a method and apparatus for controlling an event of a cable modem and reporting a status of the cable modem, the method including: determining whether to periodically allocate a transmission bandwidth of a CM-STATUS message with respect to an event occurrence of the cable modem; setting an event control encoding that includes information regarding whether to periodically allocate the transmission bandwidth; and generating a MAC Domain Descriptor (MDD) message containing the event control encoding to transmit the generated MDD message.

14 Claims, 10 Drawing Sheets

FIG. 2 (CONVENTIONAL ART)

| EVENT CODE | EVENT SITUATION | PARAMETER |
|---|---|---|
| 0 | Reserved | |
| 1 | Secondary Channel MDD timeout | Downstream channel ID |
| 2 | QAM/FEC lock failure | Downstream channel ID |
| 3 | Sequence out-of-range | DSID |
| 4 | MDD Recovery | Downstream channel ID |
| 5 | QAM/FEC Lock Recovery | Downstream channel ID |
| 6 | T4 timeout | Upstream channel ID |
| 7 | T3 re-tries exceeded | Upstream channel ID |
| 8 | Successful ranging after T3 re-tries exceeded | Upstream channel ID |
| 9 | CM operating on battery backup | None |
| 10 | CM returned to A/C power | None |
| 11 | T1 timeout | Upstream/downstream channel ID |
| 12 | Valid UCD after T1 timeout | Upstream/downstream channel ID |

FIG. 7

| Type | Length | Value |
|---|---|---|
| 11 | | Event Control Encoding Sub-TLV |
| 11.1 | 1 | Event Type Code |
| 11.2 | 2 | Maximum Event Holdoff Timer. Units of 20 msec Valid range: 1~65535 |
| 11.3 | 1 | Maximum Number of Reports per Event 0: Unlimited number of reports 1-255: Maximum number of reports for an event type reporting transactin. |
| 11.4 | 1 | CM-STATUS Polling 0 = Disable 1 = Enable 2-255 : Reserved |

METHOD FOR CONTROLLING EVENT AND REPORTING STATUS OF CABLE MODEM AND APPARATUS THEREOF

CROSS-REFERENCE TO RELATED APPLICATION

This application claims the benefit of Korean Patent Application No. 10-2008-0130429, filed on Dec. 19, 2008, in the Korean Intellectual Property Office, the disclosure of which is incorporated herein by reference.

BACKGROUND

1. Field of the Invention

The present invention relates to a method and apparatus for controlling an event of a cable modem and reporting a status of the cable modem. More particularly, the present invention relates to a method and apparatus for controlling an event of a cable modem and reporting a status of the cable modem that may request a transmission bandwidth of a CM-STATUS message using a periodically allocated polling interval as well as a contention interval, when a mode allocated for the transmission bandwidth of the CM-STATUS message is determined as the polling mode.

2. Description of the Related Art

A cable modem termination system (CMTS) and a cable modem according to a Data Over Cable Service Interface Specification (DOCSIS) 3.0 standard adopt a channel combination scheme that may transmit data via a plurality of upstream channels and downstream channels.

The cable modem capable of simultaneously transmitting and receiving data via the plurality of upstream channels and downstream channels may periodically receive a MAC Domain Descriptor (MDD) message via all the downstream channels included in a Media Access Control (MAC) domain. Here, the MDD message transmitted via a primary channel may include a set of available upstream channels and downstream channels that the cable modem may use, and control and setting information associated with the MAC domain. For example, the MDD message may include parameters associated with a CM-STATUS message reporting mechanism that is used after registration of the cable modem. When an event occurs, the cable modem may transmit the CM-STATUS message to the CMTS to thereby inform the CMTS about the occurrence of the event. The MDD message periodically transmitted by the CMTS may include information regarding an event type code that may need to be reported using the CM-STATUS message, a holdoff timer indicating when to transmit the CM_STATUS message, a maximum number of transmittable reportings, and the like.

When an event control encoding associated with the CM-STATUS message is not included in the MDD message transmitted via the primary channel, the cable modem may not transmit the CM-STATUS message to the CMTS although the event occurs.

The CMTS may control reporting about the event of the cable modem, or may instruct the cable modem to take an appropriate action for the occurrence of the event, using a CM-CTRL message. For example, the CMTS may transmit enable bistmask information associated with each of events of CM-STATUS and thereby control whether to report a corresponding event.

FIG. 1 illustrates a format of a CM-STATUS message according to a conventional art.

Referring to FIG. 1, the CM-STATUS message may include a transaction identification (ID) 102 and an event type 103 indicating which event occurs, and type/length/value (TLV) encoded information associated with a corresponding event, behind a MAC management message header 101. FIG. 2 is a table illustrating types of events reported by a cable modem using the CM-STATUS message.

In the case of the events as shown in FIG. 2, when corresponding objects are enabled, the cable modem may report the occurrence of a corresponding event to a CMTS using the CM-STATUS message. Parameters associated with an event type may include a downstream channel identifier (ID), an upstream channel ID, a Downstream Service ID (DSID), and the like.

Since the cable modem remembers that each of the events is in an "on" status or an "off" status, the cable modem may report to the CMTS about a situation where a corresponding event triggers the "on" status, or resets to the "off" status. Reporting of the event status may use a maximum holdoff timer value and a maximum report count value that are obtained from an MDD message. Here, the maximum holdoff timer denotes a point in time for transmitting the CM-STATUS message, and the maximum report count denotes a parameter about a number of transmissions.

In a Hybrid Fiber Coax (HFC) network, in the case of an upstream transmission, a plurality of cable modems may access a single CMTS to share an upstream bandwidth. Therefore, the CMTS may designate a particular cable modem, among the plurality of cable modems, to perform an upstream transmission. Specifically, a cable modem may request the CMTS for a bandwidth allocation. When the cable modem is assigned with an opportunity for the upstream transmission, the cable modem may have an opportunity to transmit a message to the CMTS. When an event occurs whereby the cable modem desires to transmit the CM-STATUS message, the cable modem may need to request the CMTS for a bandwidth allocation in order to transmit the message.

FIG. 3 illustrates a mechanism for transmitting a bandwidth allocation request message of a cable modem in a contention-based transmission interval according to the conventional art.

Referring to FIG. 3, when an event occurs in an interval 303, the cable modem may verify a contention transmission interval using a received upstream bandwidth allocation map 301, calculate a transmission opportunity using a backoff window value, and wait for the transmission opportunity by the backoff window value, and then transmit a bandwidth allocation request message 305. When the cable modem recognizes a collision 307 after the request, the cable modem may retransmit another bandwidth allocation request message 309 according to a Truncated Binary Exponential Backoff (TBEB) policy.

Here, the contention based transmission interval is allocated for only a particular cable modem. Thus, when a plurality of cable modems simultaneously performs a transmission, a collision may occur. When the collision occurs, the plurality of cable modems may need to increase a contention backoff window value and then perform a retransmission according to the TBEB policy, which results in a delay 311.

When an event that needs to transmit a CM-STATUS message occurs, a cable modem may transmit the CMTS message according to a bandwidth request using a contention scheme or a piggyback scheme. The piggyback scheme denotes a scheme that may simultaneously transmit data and request a bandwidth required for a header. Therefore, while the data is not being transmitted, reporting may need to be performed through the bandwidth request using the contention scheme. In this instance, when many cable modems access a network, or when an inter-network event occurs in a plurality of cable modems, a collision may occur in making the bandwidth request. In this case, reporting to the CMTS about the event occurrence of the cable modem may be delayed.

Accordingly, there is a need for a method that enables a cable modem to quickly and effectively report to a CMTS about a status of an event occurring in the cable modem, and enables the CMTS to quickly recognize the event occurrence of the cable modem.

SUMMARY

An aspect of the present invention provides a method and apparatus for controlling an event of a cable modem and reporting a status of the cable modem that may request a transmission bandwidth of a CM-STATUS message using a periodically allocated polling interval as well as a contention interval, when a mode allocated for the transmission bandwidth of the CM-STATUS message is determined as the polling mode, and thereby may effectively transfer the CM-STATUS message and may also quickly and effectively cope with an event occurrence of the cable modem.

According to an aspect of the present invention, there is provided an apparatus for controlling an event of a cable modem and reporting a status of the cable modem, the apparatus including: a transmission bandwidth allocation mode decision unit to determine whether to periodically allocate a transmission bandwidth of a CM-STATUS message with respect to an event occurrence of a cable modem; a message generation unit to set an event control encoding that includes information regarding whether to periodically allocate the transmission bandwidth, and to generate an MDD message containing the event control encoding.

According to another aspect of the present invention, there is provided a method of controlling an event of a cable modem and reporting a status of the cable modem, the method including: determining whether to periodically allocate a transmission bandwidth of a CM-STATUS message with respect to an event occurrence of the cable modem; setting an event control encoding that includes information regarding whether to periodically allocate the transmission bandwidth; and generating a MAC Domain Descriptor (MDD) message containing the event control encoding to transmit the generated MDD message.

Effect

According to embodiments of the present invention, there may be provided a method and apparatus for controlling an event of a cable modem and reporting a status of the cable modem that may request a transmission bandwidth of a CM-STATUS message using a periodically allocated polling interval as well as a contention interval, when a mode allocated for a transmission bandwidth of the CM-STATUS message is determined as the polling mode, and thereby may effectively transfer the CM-STATUS message and may also quickly and effectively cope with an event occurrence of the cable modem.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 2 is a table illustrating types of events reported by a cable modem using a CM-STATUS message according to the conventional art;

FIG. 7 is a diagram illustrating CM-STATUS event control encoding of FIG. 6;

DETAILED DESCRIPTION

Figure 1:
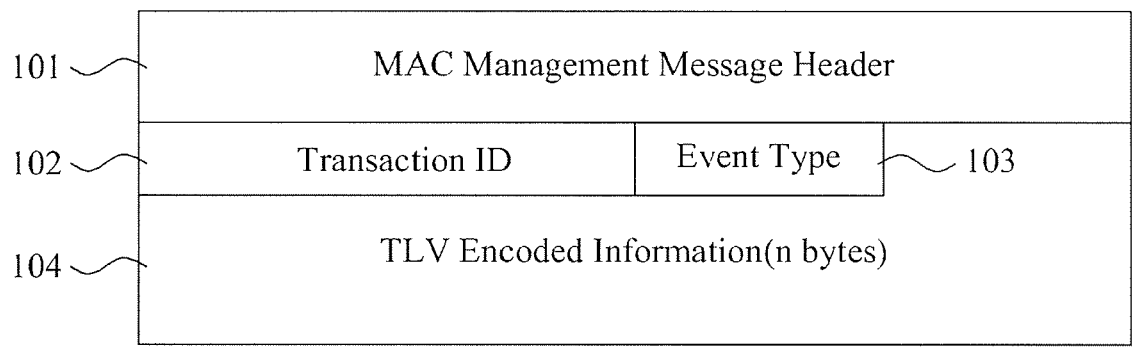
FIG. 1 illustrates a format of a CM-STATUS message according to a conventional art.
Figure 3:
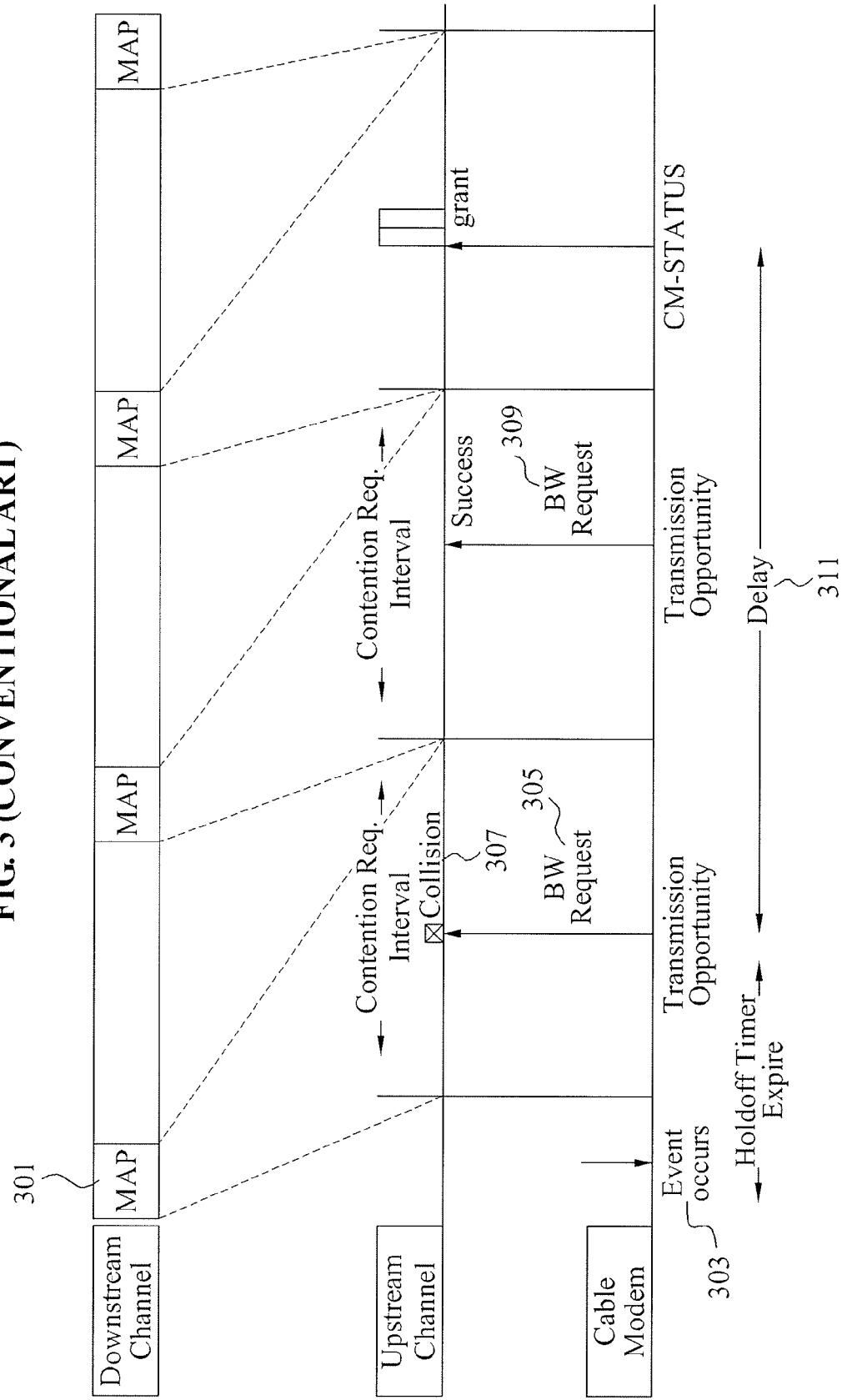
FIG. 3 is a diagram illustrating a mechanism for transmitting a bandwidth allocation request message of a cable modem in a contention based transmission interval according to the convention art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 4:
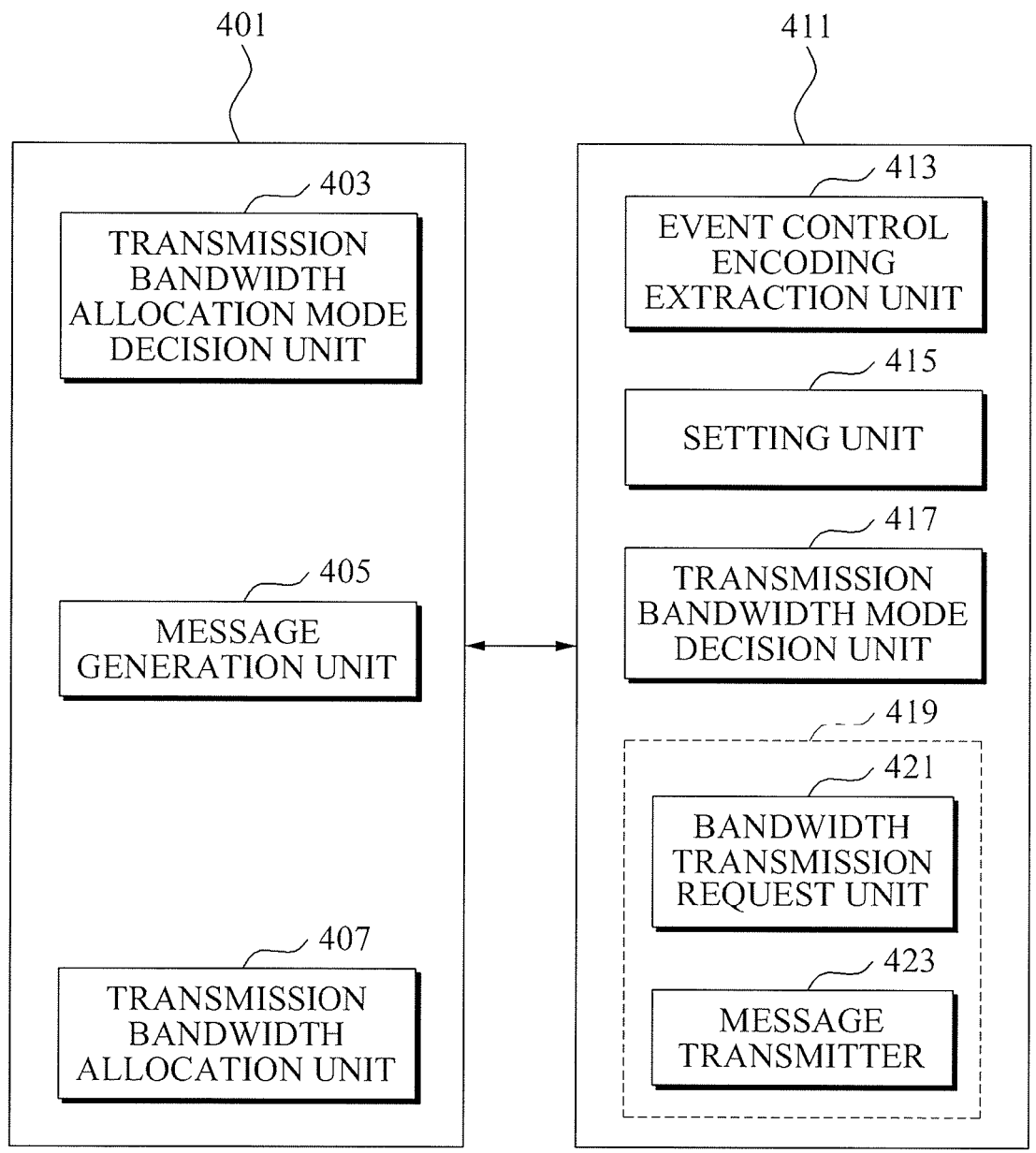
FIG. 4 is a block diagram illustrating an apparatus for controlling an event of a cable modem and reporting a status of the cable modem according to an embodiment of the present invention.
Figure 5:
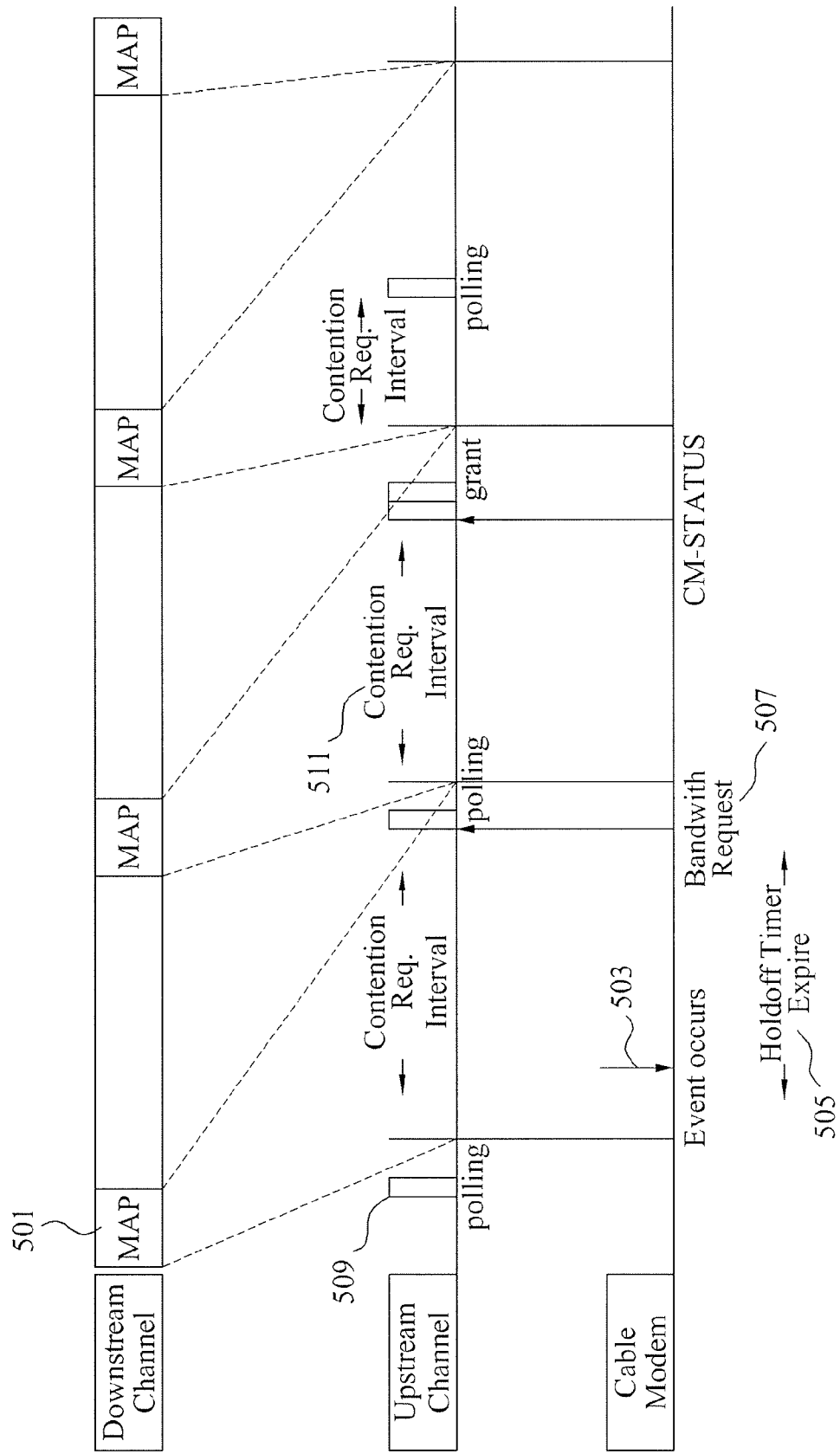
FIG. 5 is a diagram illustrating an operation mechanism when an event occurs in a cable modem according to an embodiment of the present invention.

FIG. 4 is a block diagram illustrating an apparatus for controlling an event of a cable modem 411 and reporting a status of the cable modem 411 according to an embodiment of the present invention, and FIG. 5 is a diagram illustrating an operation mechanism when an event occurs in a cable modem according to an embodiment of the present invention.

Referring to FIGS. 4 and 5, the apparatus may include a cable modem termination system (CMTS) 401 and the cable modem 411.

The CMTS 401 may include a transmission bandwidth allocation mode decision unit 403, a message generation unit 405, and a transmission bandwidth allocation unit 407.

The transmission bandwidth allocation mode decision unit 403 may determine whether to periodically allocate a transmission bandwidth of a CM-STATUS message with respect to an event occurrence of the cable modem 411.

The message generation unit 405 may set an event control encoding that includes information regarding whether to periodically allocate the transmission bandwidth, and generate a MAC Domain Descriptor (MDD) message containing the event control encoding.

Specifically, when it is determined to periodically allocate the transmission bandwidth, the message generation unit 405 may set a bandwidth allocation bit to "1" that is a polling mode, which is included in the event control encoding. The bandwidth allocation bit indicates whether to periodically allocate the transmission bandwidth. Conversely, when it is determined to not periodically allocate the transmission bandwidth, the message generation unit 405 may set the bandwidth allocation bit to zero that is a contention mode, which is included in the event control encoding. The bandwidth allocation bit indicates whether to periodically allocate the transmission bandwidth.

The message generation unit 405 may periodically transmit, via a downstream channel, an MDD message that includes a map message 501 and the event control encoding.

The transmission bandwidth allocation unit 407 may allocate the transmission bandwidth using a polling mode or a contention mode depending on whether to periodically allocate the transmission bandwidth. When a request for the transmission bandwidth of the CM-STATUS message is received from the cable modem 411, the transmission bandwidth allocation unit 407 may allocate the transmission bandwidth in response to the request.

The cable modem 411 may include an event control encoding extraction unit 413 a setting unit 415, a transmission bandwidth mode decision unit 417, and an event transmitter 419.

The event control encoding extraction unit 413 may receive the MDD message from the CMTS 401, and extract the event control encoding of the cable modem 411 from the MDD message.

The setting unit 415 may set a holdoff timer based on a maximum holdoff timer included in the extracted event control encoding of the cable modem 411.

The transmission bandwidth mode decision unit 417 may determine whether to periodically allocate the transmission bandwidth of the CM-STATUS message, based on the extracted event control encoding. Specifically, the transmission bandwidth mode decision unit 417 may determine whether to periodically determine the transmission bandwidth of the CM-STATUS message, using the bandwidth allocation bit included in the event control encoding. For example, when the bandwidth allocation bit is set to "1", the transmission bandwidth mode decision unit 417 may determine a transmission bandwidth allocation mode as the polling mode to periodically allocate the transmission bandwidth. Conversely, when the bandwidth allocation bit included in the event control encoding is set to zero, the transmission bandwidth mode decision unit 417 may determine the transmission bandwidth allocation mode as the contention mode to not periodically allocate the transmission bandwidth.

The event transmitter 419 may include a bandwidth transmission request unit 421 and a message transmitter 423.

When an event occurs in an interval 503, the transmission bandwidth request unit 421 may make a bandwidth request 507 for transmitting the CM-STATUS message after the set holdoff timer expires in an interval 505.

Specifically, when the transmission bandwidth mode decision unit 417 determines the bandwidth transmission mode as the polling mode, the transmission bandwidth request unit 421 may request the transmission bandwidth via an initially transmittable interval between a polling interval 509 and a contention interval 511. Here, the transmission bandwidth request unit 421 may request the transmission bandwidth via the initially transmittable contention interval 511. When a collision occurs in the contention interval 511, the transmission bandwidth request unit 421 may request the transmission bandwidth via a subsequent polling interval.

Conversely, when the transmission bandwidth mode decision unit 417 determines the bandwidth transmission mode as the contention mode, the transmission bandwidth request unit 421 may request the transmission bandwidth via only the contention interval 511.

When the transmission bandwidth is allocated, the message transmitter 423 may transmit the CM-STATUS message to the CMTS 401 via the allocated transmission bandwidth.

Figure 6:
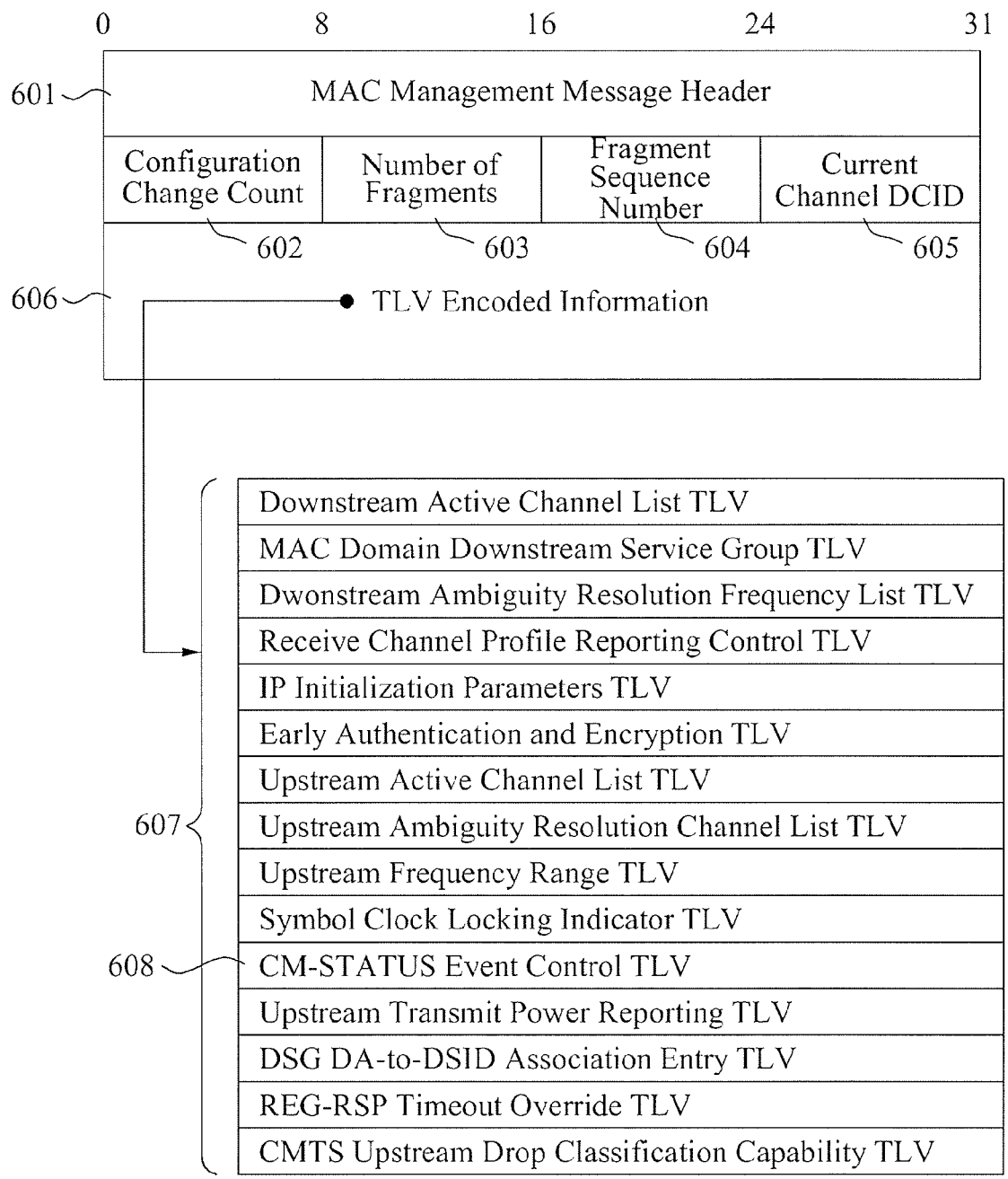
FIG. 6 is a diagram illustrating a format of a MAC Domain Descriptor (MDD) message, including an event control encoding, periodically transmitted from a cable modem termination system (CMTS) according to an embodiment of the present invention.

FIG. 6 is a diagram illustrating a format of an MDD message, including an event control encoding, periodically transmitted from a CMTS according to an embodiment of the present invention.

Referring to FIG. 6, the MDD message may be a Media Access Control (MAC) management message that is transmitted for general descriptions of a MAC domain in a cable network. The MDD message may include a MAC management message header 601, a configuration change count 602 indicating whether a message is changed, a number of fragments 603, a fragment sequence number 604, a current channel DCID 605 of transmitting the MDD message, and type/length/value (TLV) encoded information 606.

Here, the TLV encoded information may include TLVs 607. A CM-STATUS event control TLV 608 is associated with setting of CM-STATUS reporting. The CM-STATUS event control TLV 608 may include a bandwidth allocation bit indicating whether the CMTS periodically allocates a bandwidth for a transmission of the CM-STATUS message, when the event occurs in the cable modem, that is, indicating whether a polling is set.

Accordingly, through the periodically transmitted MDD message, the cable modem may be aware of whether the bandwidth is periodically allocated for the transmission of the CM-STATUS message, when the event occurs.

FIG. 7 is a diagram illustrating CM-STATUS event control encoding of FIG. 6.

Referring to FIG. 7, the CM-STATUS event control encoding of type 11 includes subtype encoding with respect to each of events that the cable modem may need to report using the CM-STATUS message when a corresponding event occurs.

Specifically, the CM-STATUS event control encoding of the type 11 may include an event type code (Type 11.1) indicating which event occurs, a maximum holdoff timer (Type 11.2) of 20 msec, a maximum number of reports per event (Type 11.3), and a bandwidth allocation bit (Type 11.4) indicating whether an event transmission bandwidth is periodically allocated.

Here, encoding of the maximum holdoff timer (Type 11.2) may be used when a cable modem waits for a predetermined period of time and then performs a transmission in order to prevent a plurality of cable modems from simultaneously transmitting the CM-STATUS message.

Specifically, the cable modem may select, as a maximum holdoff timer value, a random value in a holdoff timer interval. The cable modem may wait for the predetermined period of time corresponding to the selected maximum holdoff timer value, and then perform the transmission.

Also, the bandwidth allocation bit (Type 11.4) corresponds to encoding of CM-STATUS polling. When a value of subtype 4 is zero, the bandwidth allocation bit indicates that the cable modem is allocated with a bandwidth through a bandwidth request using an existing contention scheme. When the value of subtype 4 is 1, the bandwidth allocation bit indicates that the CMTS periodically allocates the transmission bandwidth in preparation for the occurrence of a corresponding event.

Accordingly, when the event occurs, the cable modem may receive the MDD message to verify an allocated mode with respect to the transmission bandwidth of the CM-STATUS message, and to request the transmission bandwidth according to the verified allocated mode.

Figure 8:
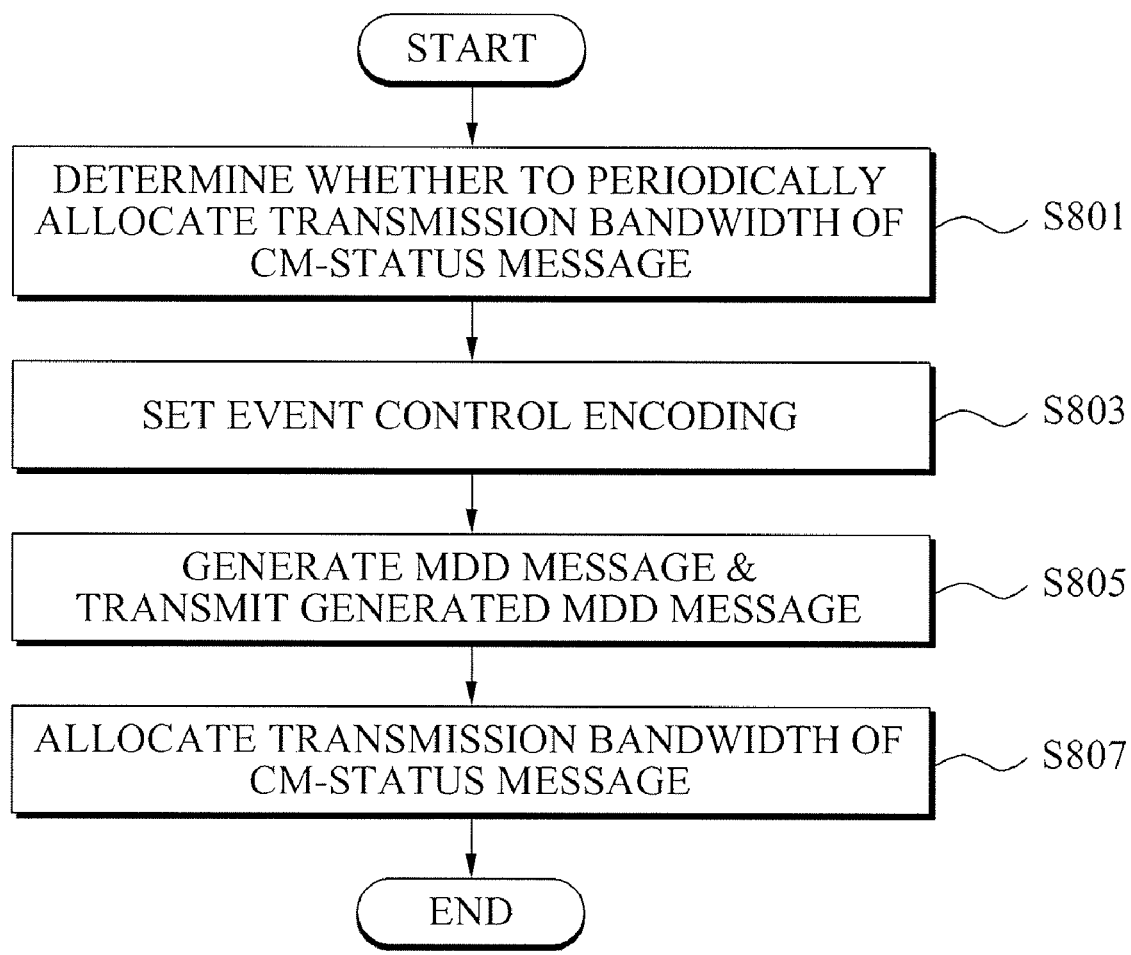
FIG. 8 is a flowchart illustrating a method of controlling an event at a CMTS in an apparatus for controlling an event of a cable modem and reporting a status of the cable modem according to an embodiment of the present invention.

FIG. 8 is a flowchart illustrating a method of controlling an event at a CMTS in an apparatus for controlling an event of a cable modem and reporting a status of the cable modem according to an embodiment of the present invention.

Referring to FIG. 8, in operation S801, the CMTS may determine whether to periodically allocate a transmission bandwidth of a CM-STATUS message with respect to an event occurrence of the cable modem.

In operation S803, the CMTS may set an event control encoding that includes information regarding whether to periodically allocate the transmission bandwidth of the CM-STATUS message.

Specifically, when it is determined to periodically allocate the transmission bandwidth, the CMTS may set a bandwidth allocation bit to "1" that is a polling mode, which is included in the event control encoding. The bandwidth allocation bit indicates whether to periodically allocate the transmission bandwidth.

Conversely, when it is determined to not periodically allocate the transmission bandwidth, the CMTS may set the bandwidth allocation bit to zero that is a contention mode, which is included in the event control encoding. The bandwidth allocation bit indicates whether to periodically allocate the transmission bandwidth.

In operation S805, the CMTS may generate a MDD message including the event control encoding, and transmit the MDD message.

For example, the CMTS may generate the MDD message including the event control encoding, as shown in FIG. 7, and transmit the MDD message to the cable modem.

In operation S807, the CMTS may allocate the transmission bandwidth of the CM-STATUS message.

Specifically, the CMTS may allocate the transmission bandwidth using a polling mode or a contention mode depending on whether to periodically allocate the transmission bandwidth. When a request for the transmission bandwidth of the CM-STATUS message is received from the cable modem, the CMTS may allocate the transmission bandwidth in response to the request.

When the CM-STATUS message is received via the allocated transmission bandwidth, the CMTS may transmit the CM-CTRL message to the cable modem and thereby instruct the cable modem such as restarting of the cable modem, an upstream channel radio frequency (RF) mute, a Cable Modem to Consumer Premise Equipment (CPE) Interface (CMCI) port forwarding disable, and the like, and may also give an event control command via each event bitmask.

Figure 9:
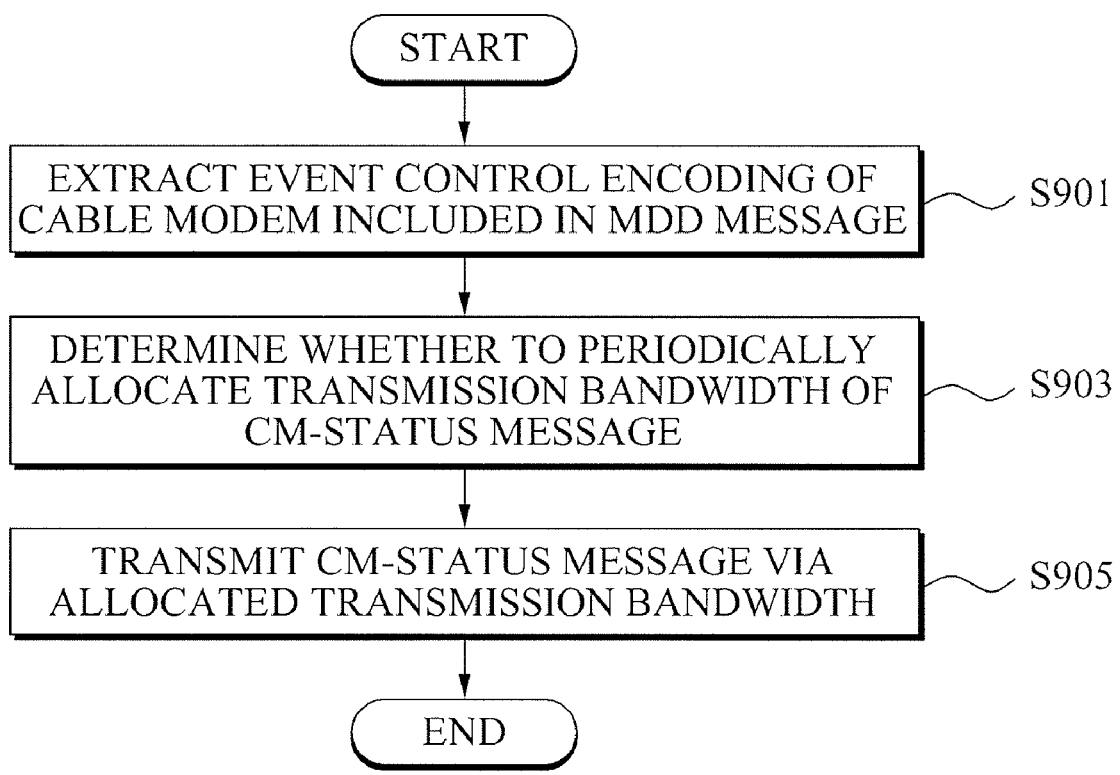
FIG. 9 is a flowchart illustrating a method of controlling an event of a cable modem in an apparatus for controlling an event of a cable modem and reporting a status of the cable modem according to an embodiment of the present invention.

FIG. 9 is a flowchart illustrating a method of controlling an event of a cable modem in an apparatus for controlling an event of a cable modem and reporting a status of the cable modem according to an embodiment of the present invention.

Referring to FIG. 9, the cable modem may extract an event control encoding of the cable modem from an MDD message in operation S901.

Specifically, the cable modem may periodically receive the MDD message from the CMTS to extract the event control encoding of the cable modem from the MDD message.

In operation S903, the cable modem may determine whether to periodically allocate a transmission bandwidth of a CM-STATUS message, based on the event control encoding.

Specifically, the cable modem may determine whether to periodically determine the transmission bandwidth of the CM-STATUS message, using the bandwidth allocation bit included in the event control encoding. For example, when the bandwidth allocation bit is set to "1", the cable modem may determine a transmission bandwidth allocation mode as the polling mode to periodically allocate the transmission bandwidth. Conversely, when the bandwidth allocation bit included in the event control encoding is set to zero, the cable modem may determine the transmission bandwidth allocation mode as the contention mode to not periodically allocate the transmission bandwidth.

In operation S905, when the event occurs, the cable modem may transmit the CM-STATUS message to the CMTS via the transmission bandwidth that is allocated using a polling mode or a contention mode depending on a decision result Specifically, when the transmission bandwidth allocation mode is determined as the polling mode, the cable modem may request the transmission bandwidth via an initially transmittable interval between a polling interval and a contention interval. Here, the cable modem may request the transmission bandwidth via the initially transmittable contention interval. When a collision occurs in the contention interval, the cable modem may request the transmission bandwidth via a subsequent polling interval.

Conversely, when the transmission bandwidth allocation mode is determined as the contention mode, the cable modem may request the transmission bandwidth via only the contention interval.

When the transmission bandwidth is allocated, the cable modem may transmit the CM-STATUS message to the CMTS via the allocated transmission bandwidth.

Figure 10:
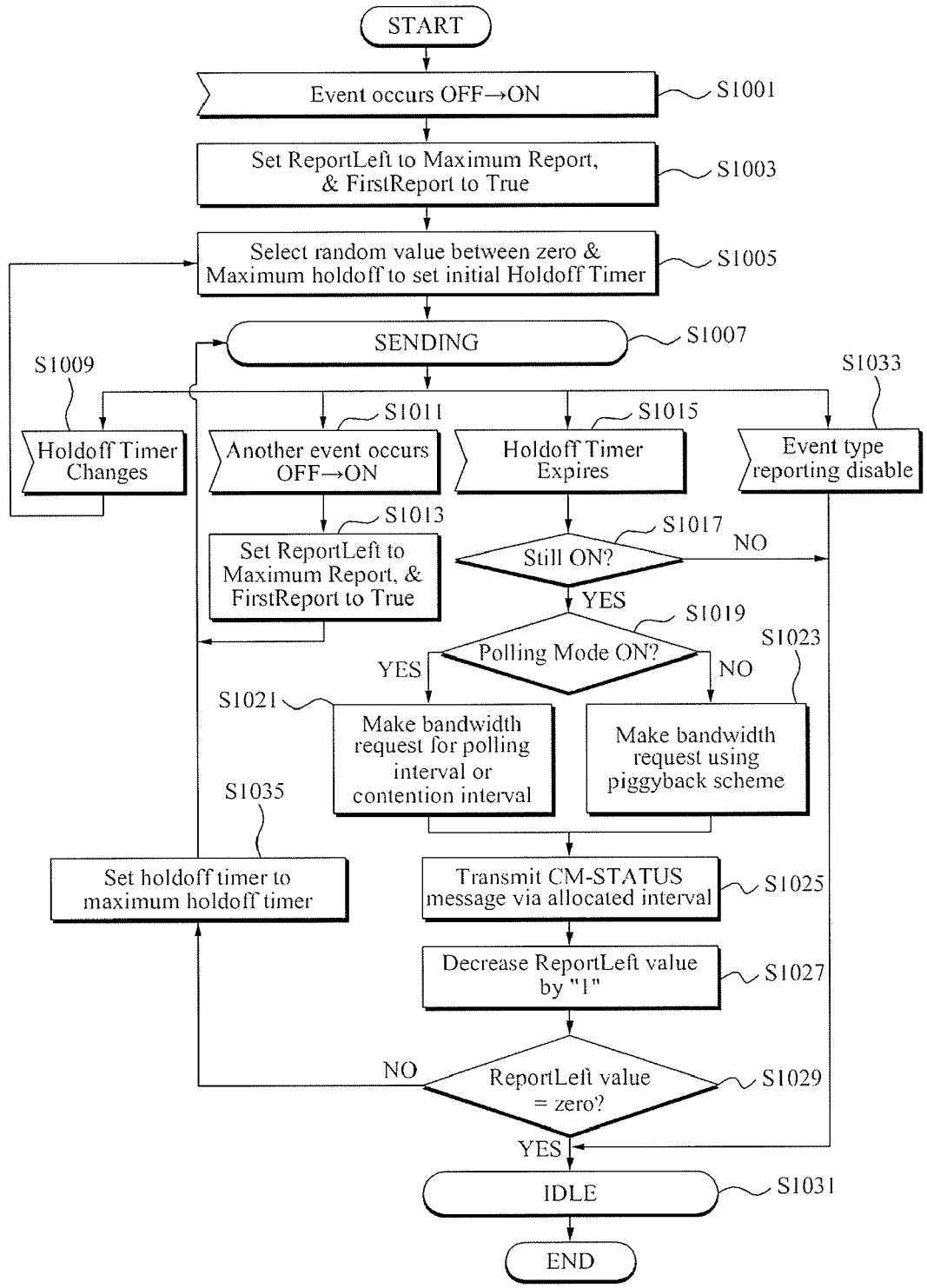
FIG. 10 is a flowchart illustrating in detail a method of controlling the event of the cable modem of FIG. 9.

FIG. 10 is a flowchart illustrating in detail a method of controlling the event of the cable modem of FIG. 9. Here, the cable modem may have an idle status and a sending status with respect to each of event types of CM-STATUS. An initial status machine of the cable modem with respect to an event occurrence may start from the idle status, and set a transaction ID to zero.

Referring to FIG. 10, when the event occurs in the idle status in operation S1001, the cable modem may set a ReportLeft value to a maximum report value, and set a FirstReport value to true in operation S1003. In operation S1005, the cable modem may select a random value between zero and a maximum holdoff value of a corresponding event, and set an initial holdoff timer. In this instance, the smaller a holdoff time interval the better. However, the holdoff time interval is greater than 20 msec. Also, to randomly select the initial value in the holdoff time interval is to prevent a collision that may occur when a plurality of cable modems simultaneously transmits a CM-STATUS message.

In operation S1007, the cable modem may be switched from the idle status to the sending status, and be continuously in the sending status while the holdoff timer works.

When the same type of another event occurs in the sending status in operation S1011, the cable modem may set a ReportLeft value to a maximum report value, and also set a FirstReport value to "1", that is, true, and then return to the sending status in operation S1013.

While waiting to transmit the CM-STATUS message, when a signal that disables reporting for the corresponding event, using a CM-CTRL message corresponding to any one of an MDD message and a MAC management message is received from a CMTS, the cable modem may suspend the transmission operation and return to the idle status in operation S1033.

When a holdoff timer change is received using the MDD message while waiting to transmit the CM-STATUS message in operation S1009, the cable modem may apply the changed holdoff timer value and return to operation S1005.

When the holdoff timer expires in the sending status in operation S1015, the cable modem may verify whether at least one event with respect to an initial event type is in an "on" status in operation S1017. When the event is not in the "on" status, the cable modem may return to the idle status without transmitting the CM-STATUS message and increasing the transaction ID.

Conversely, when the event is maintained at the "on" status, the cable modem may verify whether the CM-STATUS message is a first report of a new transaction. When the CM-STATUS message is the first report for the new transaction, the cable modem may clear a control flag of FirstReport and increase a transaction ID value with respect to the new transaction. Also, when the CM-STATUS message is not the first report for the new transaction, the cable modem may not change the transaction ID value.

Next, the cable modem may make a bandwidth request for transmitting the CM-STATUS message.

In operation S1019, the cable modem may verify whether a polling interval is open for the corresponding event, using the MDD message, that is, whether a polling mode is on.

When the polling mode is on, the cable modem may make a bandwidth request for an initially allocated interval between the polling interval and a contention interval in operation S1021. Conversely, when the polling mode is off and the contention interval or data to be transmitted exists, the cable modem may make the bandwidth request using a piggyback scheme in operation S1023.

In operation S1025, the cable modem may transmit the CM-STATUS message via the allocated interval.

When the transmission of the CM-STATUS message is terminated, the cable modem may decrease the ReportLeft value by one in operation S1027. In operation S1029, the cable modem may verify whether ReportLeft value is zero and whether the maximum report value is zero. When the maximum report value is zero, the cable modem may continuously transmit the CM-STATUS message until a CM-STATUS message reporting event is disabled. Also, when the ReportLeft value is changed from "1" to zero, it may indicate that all the CM-STATUS messages are transmitted and thus, in this event type, the cable modem may return to the idle status in operation S1031.

Conversely, when the ReportLeft value is not changed from "1" to zero, in this instance, the cable modem needs to additionally transmit the CM-STATUS message, the cable modem may restart the holdoff timer at a maximum holdoff timer to thereby return to the sending status in operation S1035. Accordingly, an initial CM-STATUS message may be transmitted using the holdoff timer of the random value, and subsequent CM-STATUS messages may be transmitted using a fixed value of the maximum holdoff value in the sending status.

The CMTS may not include an event control encoding in a primary MDD message. Therefore, when the CM-STATUS message transmission is disabled, or when enable reporting with respect to a particular event is overwritten with disable reporting, the cable modem may return to the idle status with respect to the corresponding event type.

Also, when the cable modem detects, from the MDD message, that the maximum holdoff value is changed in the sending status, the cable modem may recalculate the holdoff timer using a new maximum holdoff value. In the sending status, the cable modem may wait for a period of time corresponding to the new holdoff timer value and then perform transmission. In this instance, the ReportLeft value is not changed. Each CM-STATUS message may be reported including a single event type code.

According to embodiments of the present invention, when a mode allocated for a transmission bandwidth of a CM-STATUS message is determined as a polling point, an apparatus and method for controlling an event of a cable modem and reporting a status of the cable modem may request the transmission bandwidth of the CM-STATUS message using a periodically allocated polling interval as well as a contention interval. Therefore, it is possible to effectively transfer the CM-STATUS message and to quickly and effectively cope with an event occurrence of the cable modem.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of controlling an event of a cable modem at a cable modem termination system (CMTS), the method comprising:

determining whether to periodically allocate a transmission bandwidth of a CM-STATUS message with respect to an event occurrence of the cable modem;

setting an event control encoding that includes information regarding whether to periodically allocate the transmission bandwidth, setting a bandwidth allocation bit to a first value that is a polling mode, when it is determined to periodically allocate the transmission bandwidth, wherein the bandwidth allocation bit indicates whether to periodically allocate the transmission bandwidth; and setting the bandwidth allocation bit to a second value that is a contention mode, when it is determined to not periodically allocate the transmission bandwidth, wherein the bandwidth allocation bit indicates whether to periodically allocate the transmission bandwidth; and generating a MAC Domain Descriptor (MDD) message containing the event control encoding to transmit the generated MDD message.

2. The method of claim 1,
wherein the first value is "1" and the second value is zero.

3. The method of claim 1, further comprising:
allocating the transmission bandwidth using the polling mode or the contention mode, depending on whether to periodically allocate the transmission bandwidth.

4. A method of controlling an event of a cable modem, the method comprising:

receiving an MDD message from a CMTS;

extracting an event control encoding of the cable modem from the MDD message;

determining whether to periodically allocate a transmission bandwidth of a CM-STATUS message, based on the extracted event control encoding, determining a transmission bandwidth allocation mode as the polling mode to periodically allocate the transmission bandwidth, when a bandwidth allocation bit included in the event control encoding is set to a first value; and determining the transmission bandwidth allocation mode as the contention mode to not periodically allocate the transmission bandwidth, when the bandwidth allocation bit included in the event control encoding is set to a second value; and transmitting the CM-STATUS message to the CMTS via the transmission bandwidth that is allocated using a polling mode or a contention mode depending on a decision result, when the event of the cable modem occurs.

5. The method of claim 4,
wherein the first value is "1" and the second value.

6. The method of claim 4, wherein the transmitting comprises:
requesting the transmission bandwidth via an initially transmittable interval between a polling interval and a contention interval, when the transmission bandwidth allocation mode is determined as the polling mode; and
transmitting the CM-STATUS message to the CMTS via the transmission bandwidth, when the transmission bandwidth is allocated.

7. The method of claim 6, further comprising:
requesting the transmission bandwidth via a subsequent polling interval, when a collision occurs in the contention interval and the subsequent polling interval exists.

8. A CMTS comprising:
a transmission bandwidth allocation mode decision unit to determine whether to periodically allocate a transmission bandwidth of a CM-STATUS message with respect to an event occurrence of a cable modem;
a message generation unit to set an event control encoding that includes information regarding whether to periodically allocate the transmission bandwidth, and to generate an MDD message containing the event control encoding, and
when it is determined to periodically allocate the transmission bandwidth, the message generation unit sets a bandwidth allocation bit to a first value that is a polling mode, and the bandwidth allocation bit indicates whether to periodically allocate the transmission bandwidth, and
when it is determined to not periodically allocate the transmission bandwidth, the message generation unit sets the bandwidth allocation bit to a second value that is a contention mode, and the bandwidth allocation bit indicates whether to periodically allocate the transmission bandwidth.

9. The CMTS of claim 8,
wherein the first value is "1" and the second value is zero.

10. The CMTS of claim 8, further comprising:
a transmission bandwidth allocation unit to allocate the transmission bandwidth using the polling mode or the contention mode depending on whether to periodically allocate the transmission bandwidth.

11. A cable modem comprising:
an event control encoding extraction unit to receive an MDD message from a CMTS, and to extract an event control encoding of the cable modem from the MDD message;
a transmission bandwidth mode decision unit to determine whether to periodically allocate a transmission bandwidth of a CM-STATUS message, based on the extracted event control encoding; and
an event transmitter to transmit the CM-STATUS message to the CMTS via the transmission bandwidth that is allocated using a polling mode or a contention mode depending on a decision result, when the event of the cable modem occurs, and
when a bandwidth allocation bit included in the event control encoding is set to a first value, the transmission bandwidth mode decision unit determines a transmission bandwidth allocation mode as the polling mode to periodically allocate the transmission bandwidth, and
when the bandwidth allocation bit included in the event control encoding is set to a second value, the transmission bandwidth mode decision unit determines the transmission bandwidth allocation mode as the contention mode to not periodically allocate the transmission bandwidth.

12. The cable modem of claim 11,
wherein the first value is "1" and the second value is zero.

13. The cable modem of claim 11, wherein the event transmitter comprises:
a transmission bandwidth request unit to request the transmission bandwidth via an initially transmittable interval between a polling interval and a contention interval, when the transmission bandwidth allocation mode is determined as the polling mode; and
a message transmitter to transmit the CM-STATUS message to the CMTS via the transmission bandwidth, when the transmission bandwidth is allocated.

14. The cable modem of claim 13, wherein, when a collision occurs in the contention interval and the subsequent polling interval exists, the transmission bandwidth request unit requests the transmission bandwidth via a subsequent polling interval.

* * * * *